United States Patent
Suga

(10) Patent No.: US 8,693,069 B2
(45) Date of Patent: Apr. 8, 2014

(54) DOCUMENT READING APPARATUS

(75) Inventor: Takayuki Suga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 13/472,859

(22) Filed: May 16, 2012

(65) Prior Publication Data

US 2012/0307318 A1    Dec. 6, 2012

(30) Foreign Application Priority Data

May 31, 2011    (JP) ................ 2011-122752

(51) Int. Cl.
*H04N 1/04* (2006.01)
*G06K 15/00* (2006.01)
*H04N 1/46* (2006.01)
*G02B 26/08* (2006.01)

(52) U.S. Cl.
USPC .......... 358/474; 358/3.08; 358/505; 358/483; 359/216.1

(58) Field of Classification Search
USPC ............. 358/474, 3.08, 505, 483; 359/216.1
See application file for complete search history.

(56) References Cited

U.S. PATENT DOCUMENTS

| | | | |
|---|---|---|---|
| 6,831,760 B2 * | 12/2004 | Kimura | 358/483 |
| 7,483,182 B2 * | 1/2009 | Tsai | 358/474 |
| 8,482,814 B2 * | 7/2013 | Hirokawa et al. | 358/474 |
| 2001/0033397 A1 * | 10/2001 | Kimura | 358/474 |
| 2002/0057467 A1 * | 5/2002 | Tamaru | 358/505 |
| 2002/0167689 A1 * | 11/2002 | Yui | 358/474 |
| 2005/0007637 A1 * | 1/2005 | Tsai | 358/474 |
| 2005/0179951 A1 * | 8/2005 | Urakawa | 358/3.08 |
| 2011/0051202 A1 * | 3/2011 | Hirokawa et al. | 358/474 |
| 2012/0250131 A1 * | 10/2012 | Murodate et al. | 359/216.1 |

FOREIGN PATENT DOCUMENTS

JP    2001-245098 A    9/2001

* cited by examiner

*Primary Examiner* — Charlotte M Baker
*Assistant Examiner* — Rury Grisham
(74) *Attorney, Agent, or Firm* — Canon USA Inc. IP Division

(57) ABSTRACT

A document reading apparatus includes a document positioning plate on which a document is placed, an image-forming unit configured to cause a light from the document to form an image, a reading unit configured to receive the light from the document which has passed through the image-forming unit, a supporting member for supporting the image-forming unit, a fixing member for fixing a reading element, and a frame member for holding the image-forming unit, the supporting member, the reading element and the fixing member.

7 Claims, 5 Drawing Sheets

DOCUMENT READING APPARATUS

BACKGROUND OF THE INVENTION

1. Field of the Invention

The present invention relates to a document reading apparatus that reads out a document placed on a document positioning plate while moving a frame member onto which a reading element is held.

2. Description of the Related Art

Conventional image reading apparatus includes a platen glass on which a document is placed, alight source that illuminates a light on the document, a lens that causes a diffused light from the document to form an image, an image reading element such as a charge coupled device (CCD) that reads out an image-formed light, and an electric board for driving the image reading element. Then, a positional relationship among the platen glass, the lens, and the image reading element is adjusted, during assembly of the image reading apparatus, and the lens and the reading element are fixed to other member so that the positional relationship between the lens and the image reading element may not deviate.

FIG. 5 illustrates a scanning unit of the image reading apparatus, using an integrated optical system that integrally holds a light source 501, a lens 502, an image reading element 503, and an electric board 504, and scans a document. The scanning unit is configured such that the image reading element 503 and the electric board 504 are fixed to the holding member 505 located between the image reading element 503 and the electric board 504. Then, end portions of the holding member 505 are fixed to a carriage frame member by soldering.

Further, Japanese Patent Application Laid-Open No. 2001-245098 discusses a method for fixing a spacer which holds the CCD and the electric board with screw-fixing only in the vicinity of the CCD. In the scanning unit illustrated in FIG. 5, the end portions of the holding member are fixed by soldering. Consequently, when the electric board and the image reading element generate heat during scanning operation, the holding member will expand due to the heat, and the holding member will suffer warpage. When the warpage occurs in the holding member, the position of image reading element relative to the lens will be shifted, and focus or magnification will be shifted.

Further, in the method discussed in Japanese Patent Application Laid-Open No. 2001-245098, since the end portions of the electric board are not fixed, vibration occurs when an integrated optical system to which the CCD has been fixed is moved to scan a document. Then, a position of the CCD will be minutely changed due to the vibration. There is a possibility that defects may occur such that jitter occurs on the read-out image.

SUMMARY OF THE INVENTION

The present invention is directed to providing ability to inhibit an influence of heat, or vibration generated from an electric board or an image reading element during document reading operation, and to read out an image with a high degree of accuracy.

According to an aspect of the present invention, a document reading apparatus includes a document positioning plate on which a document is placed, an imaging unit, a reading unit configured to receive the light from the document which has passed through the imaging unit, a supporting member configured to support the imaging unit, a fixing member configured to fix a reading element, and a frame member configured to hold the imaging unit, the supporting member, the reading element and the fixing member. The fixing member is fixed to the supporting member by a first fixing portion located in the vicinity of the reading unit, and fixed to the frame member by a second fixing portion at a position closer to an end portion side than a position of the first fixing portion. The second fixing portion has higher elasticity than that of the first fixing portion.

According to another aspect of the present invention, a document reading apparatus includes a document positioning plate on which a document is placed, an imaging unit, a reading unit configured to receive the light from the document which has passed through the image-forming unit, a supporting member configured to support the image-forming unit, a fixing member configured to fix a reading element, and a frame member configured to hold the imaging unit, the supporting member, the reading element and the fixing member. The fixing member is firmly fixed to the supporting member by a first fixing portion located in the vicinity of the reading unit, and elastically fixed to the frame member by a second fixing portion at a position closer to an end portion side than a position of the first fixing portion Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
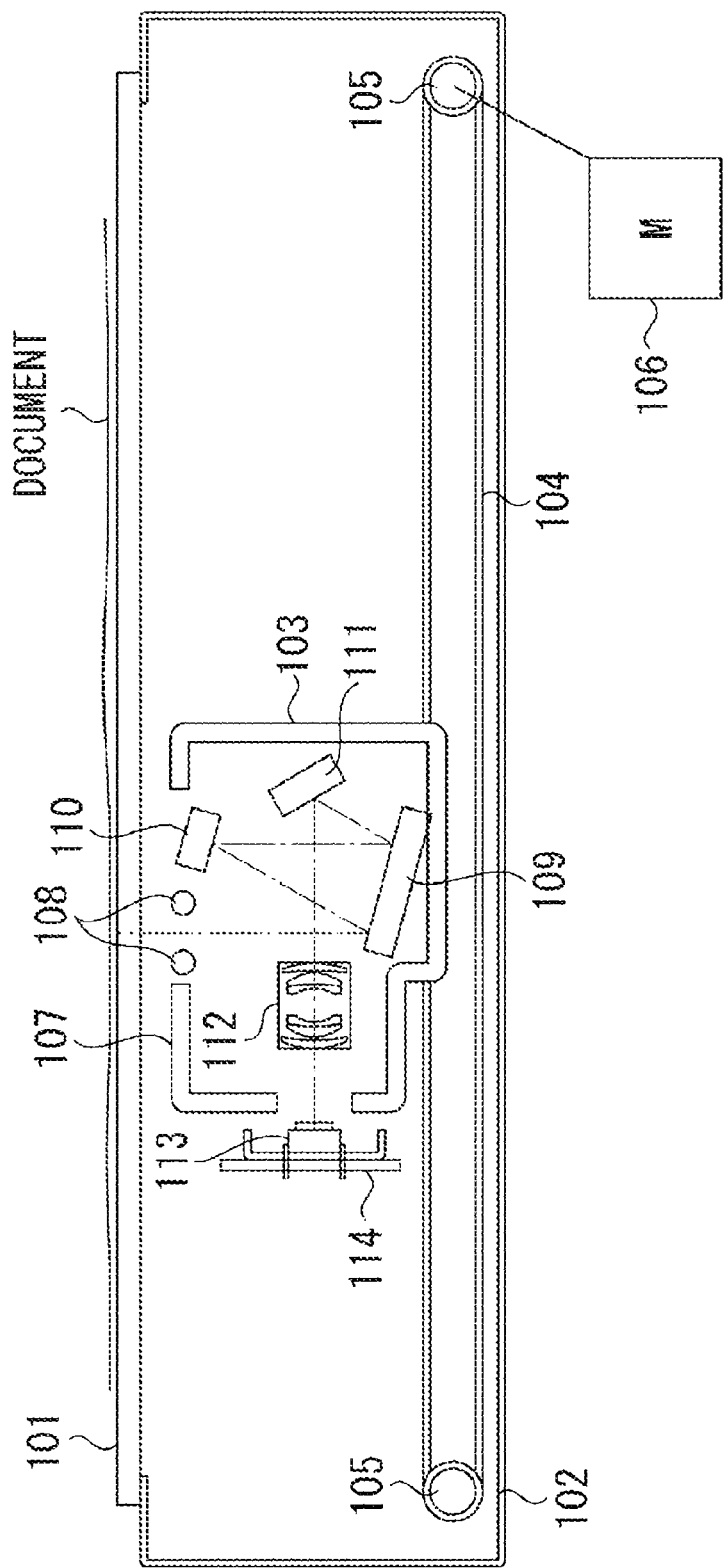
FIG. 1 illustrates a configuration of an image reading apparatus according to a first exemplary embodiment.

A first exemplary embodiment will be described. FIG. 1 illustrates an outline of a configuration of an image reading apparatus according to the first exemplary embodiment.

A document is placed on a platen glass 101. A frame member 102 supports the platen glass 101. A scanning unit 103 moves, according to movement of a belt 104, between two pulleys 105 that drive the belt 104 to scan the document placed on the platen glass 101. A motor 106 rotationally drives one of the pulleys 105.

The scanning unit 103 includes a carriage frame member 107, a light source 108 that illuminates the document, reflection mirrors 109, 110, and 111 that guide a light diffused from the document, a lens 112 that causes the light to form a focused-image, a CCD 113 serving as a reading element that photoelectrically converts and reads out the image-formed light, and an electric board 114 that drives the CCD 113. Then, these components are integrally mounted on the carriage frame member 107. The carriage frame member 107 is required to move in a state of supporting these components. Accordingly, resin molding, i.e., method that satisfies both of weight-saving and realization of complicated shape, is employed for manufacturing the carriage frame member 107.

When the image reading apparatus reads out an image of the document placed on the platen glass 101, the motor 106 is rotated while the light source 108 illuminating the document, and the scanning unit 103 is moved along the document by the pulleys 105 and the belt 104. The light from the light source 108 which has illuminated the document is diffused from the document surface, guided to a lens 112 by the reflection mirrors 109, 110, and 111, caused to form the focused-image on the CCD 113 by the lens 112, and is photoelectrically converted by the CCD 113. Then, image data is output from the CCD 113.

Figure 2:
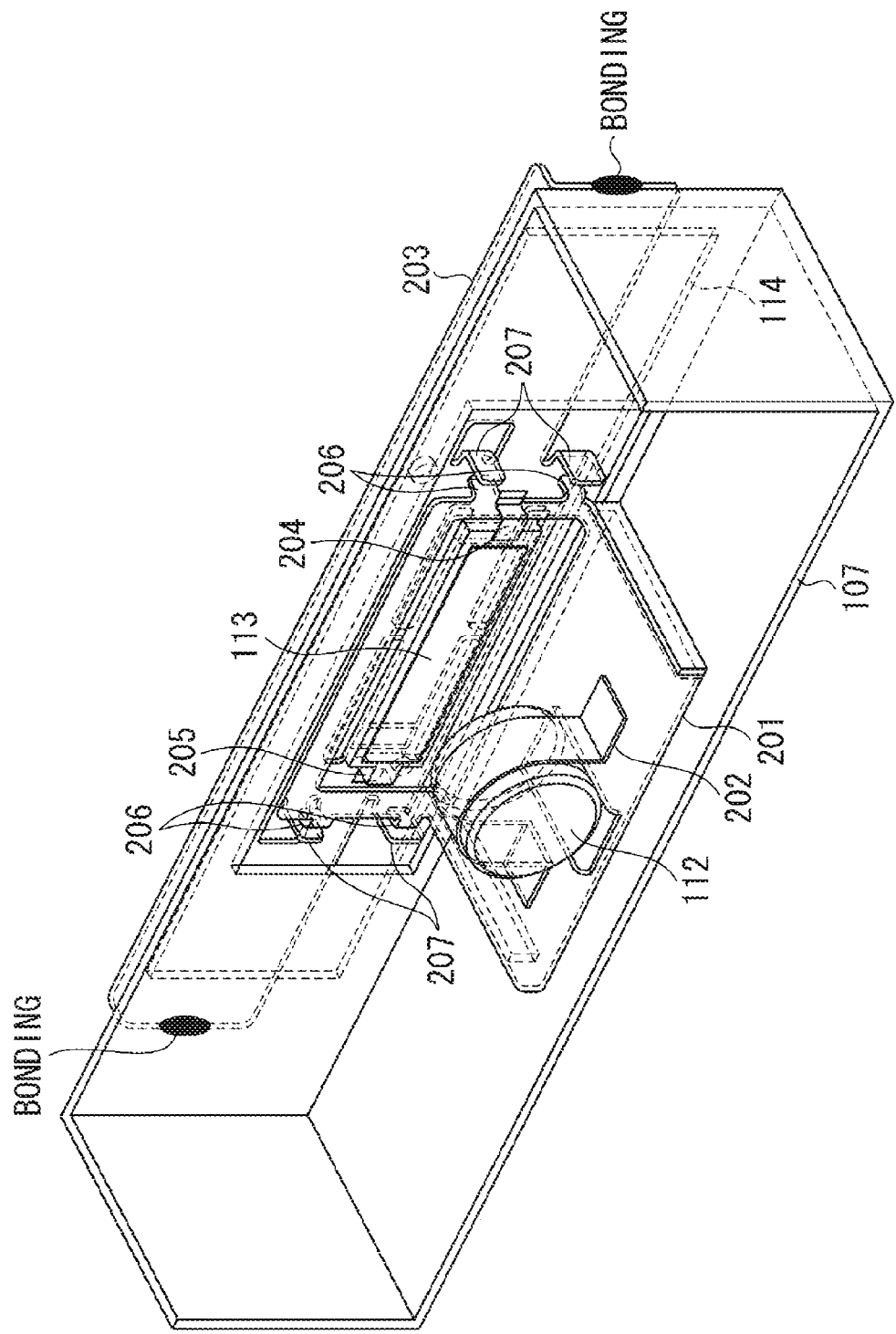
FIG. 2 is a perspective view illustrating a configuration near a CCD within a carriage frame member in the first exemplary embodiment.
Figure 3:
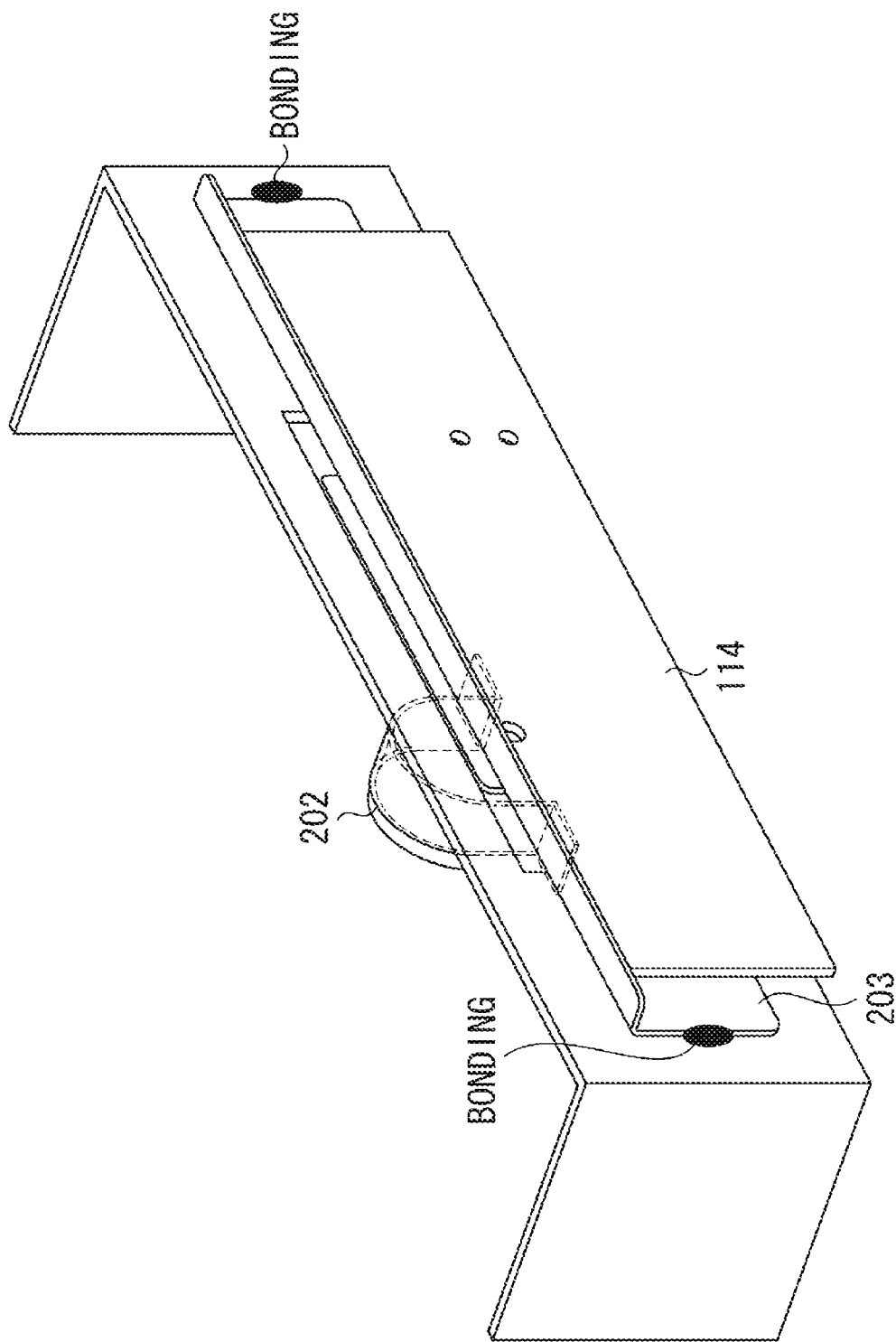
FIG. 3 is a perspective view for illustrating a configuration of an electric board and a CCD fixing plate and a lens fixing spring in the first exemplary embodiment.

FIG. 2 is a perspective view near the CCD 113 within the carriage frame member 107. FIG. 3 is a view for illustrating a configuration of the electric board 114 and a CCD fixing plate 203 and a lens fixing spring 202.

A lens supporting plate 201 is a supporting plate that supports the lens 112, and is fixed to the carriage frame member 107 with screws. The lens fixing spring 202 is a spring that fixes the lens 112 to the lens supporting plate 201. The CCD fixing plate 203 is a supporting plate that supports the CCD 113 and the electric board 114. CCD fixing springs 204 and 205 are springs that fix the CCD 113 to the CCD fixing plate 203.

The lens supporting plate 201 and the CCD fixing plate 203 are formed of a metal to keep their strengths, since deterioration of images may be invited when deformation or vibration thereof occurs. The CCD 113 fixed to the CCD fixing plate 203 by the CCD fixing spring 204 and 205 is soldered to the electric board 114 so that it is electrically connected thereto while the CCD fixing plate 203 is sandwiched therebetween.

On the electric board 114 arranged are a circuit that generates an electrical signal for controlling drive of the CCD 113 and a circuit that processes an image signal which has been input from the CCD 113, and a length of the electric board 114 is significantly longer than a length of the CCD 113.

When an optical performance such as the focus or magnification of the scanning unit is adjusted, positional relationship between the CCD 113 and the lens 112 is adjusted. To this end, by causing the CCD fixing plate 203 or the electric board 114 to be chucked to an adjustment tool and to be moved, the CCD 113 is moved to a position where a predetermined optical performance is achieved. As chucking by tools, chucking by a magnetic force and chucking by air suction are generally known. However, the electric board can neither be chucked by the magnetic force, since it is not a metal, nor be chucked even by the air suction, since an element, which constitutes the circuit, is mounted on substrate surface and there are irregularities thereon. Thus, in the present exemplary embodiment, the CCD fixing plate 203 is made further longer than the electric board 114, and both end portions thereof are chucked with the tool. The CCD fixing plate 203 is formed of a metal to secure strength, then, there are no irregularities on the surface. Therefore, the CCD fixing plate 203 can be chucked by any one of the magnetic force and the air suction.

By moving the chucked CCD fixing plate 203, relative positional relationship between the lens 112 and the CCD 113 is adjusted so that optical performance such as the focus or magnification becomes a predetermined value.

On the lens supporting plate 201 and the CCD fixing plate 203, the protruding portions 206 and 207 are provided in the vicinity of the CCD 113 to fix the CCD fixing plate 203 to the lens supporting plate 201, and clearance exists between the two protruding portions opposed to each other. In the present exemplary embodiment, the CCD 113 is fixed near the central part of the CCD fixing plate 203. To keep the relative positional relationship between the lens 112 and the CCD 113 which has been adjusted so that optical performance such as the focus or magnification becomes the predetermined value, the solder is poured into the clearance between the protruding portions 206 and 207 provided on the lens supporting plate 201 and the CCD fixing plate 203, and is fused to fix the lens supporting plate 201 and the CCD fixing plate 203. According to the method, with a simple configuration, the relative positional relationship between the CCD fixing plate 203 and the lens supporting plate 201 can be three-dimensionally adjusted and fixed.

At the both end portions of the CCD fixing plate 203, resin adhesive having elasticity is poured between the carriage frame member 107 on which the lens supporting plate 201 is mounted and the CCD fixing plate 203, and the CCD fixing plate 203 is elastically mounted onto the carriage frame member 107.

Since the solder has higher strength compared with the resin adhesive or the like, and has also a lower coefficient of linear expansion, the positional deviation of the CCD 113 due to shock can be reduced to less than the case where resin adhesive is used, by firmly fixing the CCD fixing plate 203 and the lens supporting plate 201 using the solder therebetween. The protruding portions 206 and 207 are provided in the vicinity of the CCD 113, and are firmly fixed by the solder having high strength. As a result, the CCD can be inhibited from positional deviation by an influence of thermal expansion of the lens supporting plate 201 and the CCD fixing plate 203 due to heat generation during the CCD drive.

By fixing the end portions of the CCD fixing plate 203 to the carriage frame member 107 with the resin adhesive having an elasticity, vibration which occurs during operation, especially acceleration or deceleration, of the scanning unit can be inhibited from propagating through the CCD fixing plate 203, owing to the elasticity of the resin adhesive.

The CCD fixing plate 203 which is formed of a metal and in contact with the CCD 113 and the electric board 114 which serve as a heat generating source performs radiation of heat generated in the CCD 113 and the electric board 114. However, the CCD fixing plate 203 expands due to the heat. In the present exemplary embodiment, since the CCD fixing plate 203 is fixed to the carriage frame member using an elastic member, the CCD fixing plate 203 can be inhibited from the warpage due to expansion compared with the case where the CCD fixing plate 203 is fixed by the solder.

Hence, the CCD 113 can be inhibited from positional deviation by warping of the CCD fixing plate 203.

In this way, the CCD fixing plate 203 and the lens supporting plate 201 are firmly fixed by the solder, and the CCD fixing plate 203 and the carriage frame member 107 are fixed by the resin adhesive. Consequently, the relative positional relationship between the lens 112 and the CCD 113 can be inhibited from being changed due to heat generation and vibration. In other words, according to the present exemplary embodiment, it becomes possible to prevent images from deteriorating due to heat generation during continuous operation or vibration during scanning operation, and to obtain good images at any time.

Figure 4:
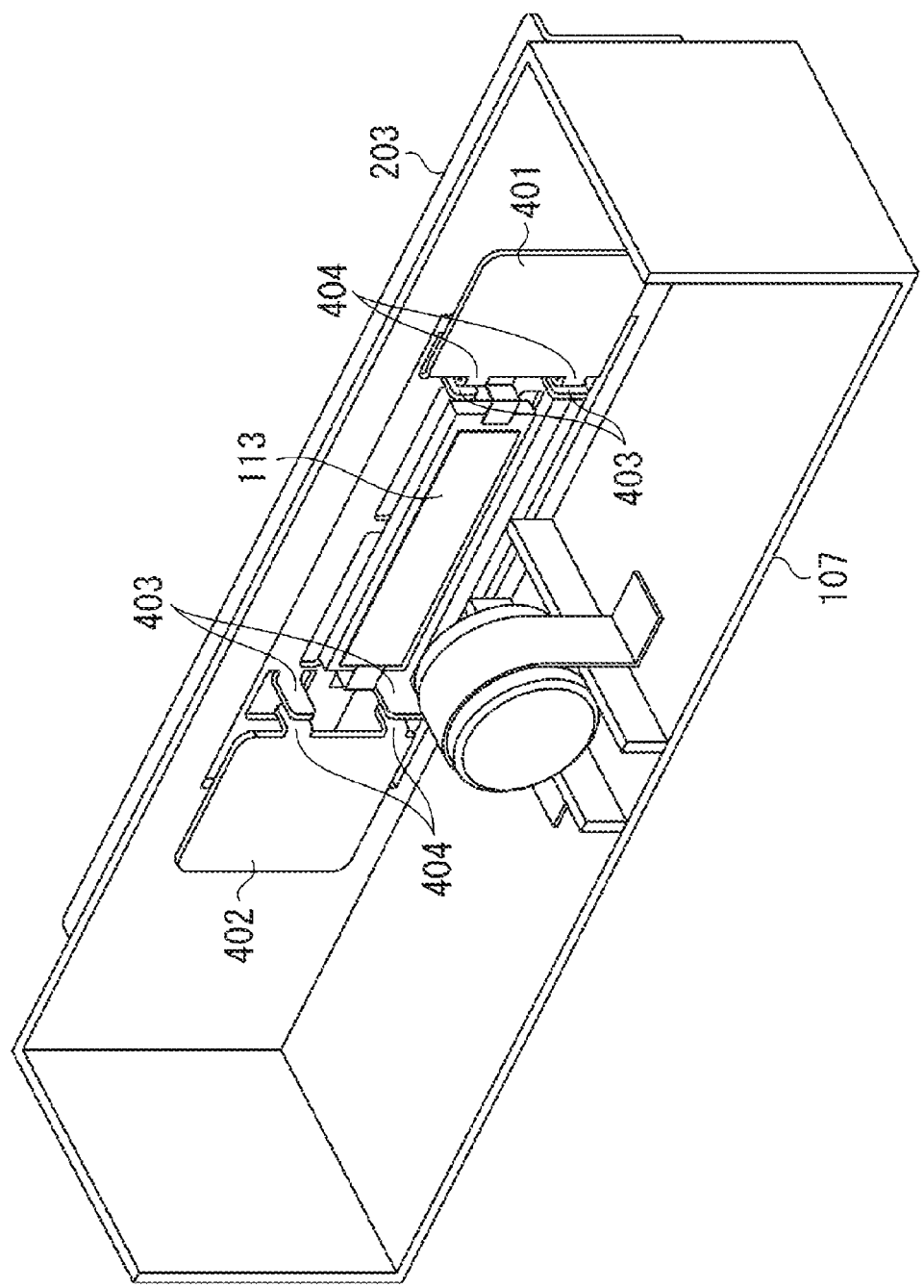
FIG. 4 is a perspective view illustrating a configuration near the CCD within the carriage frame member in a second exemplary embodiment.
Figure 5:
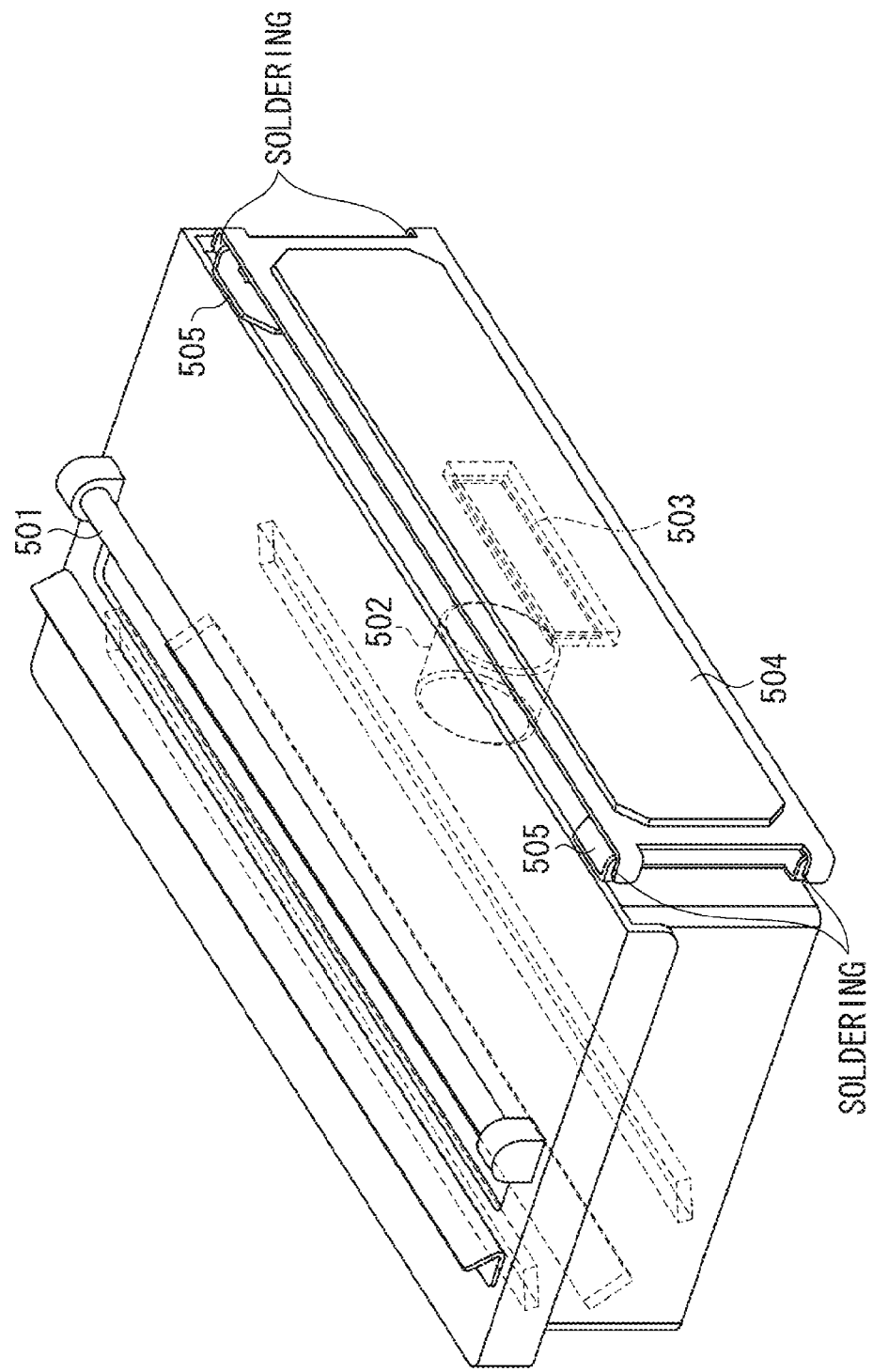
FIG. 5 illustrates a configuration of a scanning unit of conventional image reading apparatus.

A second exemplary embodiment will be described. The second exemplary embodiment will be described with reference to FIG. 4. FIG. 4 is a perspective view near the CCD 113 of the carriage frame member 107 in FIG. 1.

In the second exemplary embodiment, the lens 112 is fixed to the carriage frame member 107 by the lens fixing spring 202. Then, to the carriage frame member 107, metallic mounting plates 401 and 402 for mounting the CCD fixing plate 203 are fixed with screws. Similarly to the first exemplary embodiment, in a state where the CCD 113 is fixed to the CCD fixing plate 203 by the CCD fixing spring, the CCD 113 is soldered with the electric board (not illustrated), while the CCD fixing plate 203 is sandwiched therebetween, so as to be electrically connected thereto.

On the mounting plates 401 and 402 and the CCD fixing plate 203, the protruding portions 403 and 404 for fixing the CCD fixing plate to the mounting plates 401 and 402 are provided just proximal to the CCD 114, and clearance is present between the protruding portions opposed to each other. The relative positional relationship between the lens 112 and the CCD 113 is adjusted so that optical performance such as the focus and magnification becomes equal to the predetermined value. The solder is poured into clearance between the protruding portions 403 and 404 provided on the mounting plate 401 and 402 and the CCD fixing plate 203, and is fused to fix the protruding portions 403 and 404.

On the both end portions of the CCD fixing plate 203, similarly to the first exemplary embodiment, resin adhesive having the elasticity is poured between the carriage frame member 107 and the CCD fixing plate 203, and the CCD fixing plate 203 is elastically mounted to the carriage frame member 107.

The CCD fixing plate 203 and the mounting plates 401 and 402 are formed of a metal which can secure strength, and the carriage frame member 107 is formed by resin molding which enables lightweight while realizing complicated shape.

In this way, in the second exemplary embodiment, in the vicinity of the CCD 113 the CCD fixing plate 203 and the carriage frame member 107 which supports the lens are firmly fixed by the solder, and at the end portions of the CCD fixing plate 203 the CCD fixing plate 203 and the carriage frame member 107 are fixed by the resin adhesive. With the configuration, similarly to the first exemplary embodiment, it becomes possible to prevent images from deteriorating due to heat generation during continuous operation or vibration during scanning operation, and to obtain good images at any time.

In the first and the second exemplary embodiment, the CCD is used as the image reading element but other image reading elements such as a complementary metal oxide semiconductor (CMOS) may be used.

Further, as a method for elastically fixing the both end portions of the CCD fixing plate 203, a configuration for fixing the CCD fixing plate 203 with screws to the carriage frame member 107 via an elastic member, such as for example rubber bush may be used.

Further, fixation of the lens supporting plate 201 and the CCD fixing plate 203 in the first exemplary embodiment and fixation of the mounting plates 401 and 402 and the CCD fixing plate 203 in the second exemplary embodiment only need a fixing method which ensures a high strength, and other methods for fixing via a metallic member such as using screws in place of the solder may be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-122752 filed May 31, 2011, which is hereby incorporated by reference herein in its entirety.

What is claimed is:

1. A document reading apparatus comprising:
   a document positioning plate on which a document is placed;
   an imaging unit;
   a reading unit configured to receive the light from the document which has passed through the imaging unit;
   a supporting member configured to support the imaging unit;
   a fixing member configured to fix the reading unit; and
   a frame member configured to hold the imaging unit, the supporting member, the reading unit and the fixing member,
   wherein the fixing member is fixed to the supporting member by a first fixing portion located in the vicinity of the reading unit, and fixed to the frame member by a second fixing portion at a position closer to an end portion side than a position of the first fixing portion, and
   wherein the second fixing portion has higher elasticity than that of the first fixing portion.

2. The document reading apparatus according to claim 1, wherein the first fixing portion fixes the fixing member to the supporting member using a metal, and the second fixing portion fixes the fixing member to the frame member using resin.

3. The document reading apparatus according to claim 2, wherein the first fixing portion fixes the fixing member to the supporting member using solder.

4. The document reading apparatus according to claim 1, wherein the first fixing portion has higher hardness than that of the second fixing portion.

5. A document reading apparatus comprising:
   a document positioning plate on which a document is placed;
   an imaging unit;
   a reading unit configured to receive the light from the document which has passed through the imaging unit;
   a supporting member configured to support the imaging unit;
   a fixing member configured to fix the reading unit; and
   a frame member configured to hold the image-forming unit, the supporting member, the reading unit and the fixing member,
   wherein the fixing member is firmly fixed to the supporting member by a first fixing portion located in the vicinity of the reading unit, and elastically fixed to the frame member by a second fixing portion at a position closer to an end portion side than a position of the first fixing portion.

6. The document reading apparatus according to claim 5, wherein the first fixing portion firmly fixes the fixing member to the supporting member using a metal, and the second fixing portion fixes the fixing member to the frame member using resin.

7. The document reading apparatus according to claim 5, wherein the first fixing portion firmly fixes the fixing member to the supporting member using solder.

* * * * *